W. BANDY.
NUT LOCK.
APPLICATION FILED APR. 13, 1912.
1,051,188. Patented Jan. 21, 1913.
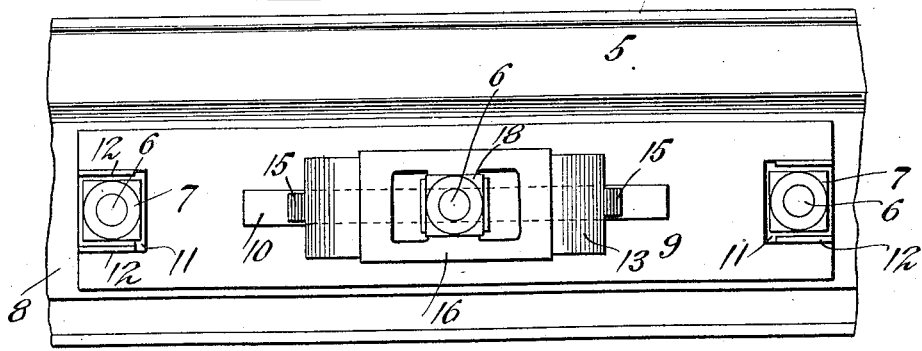
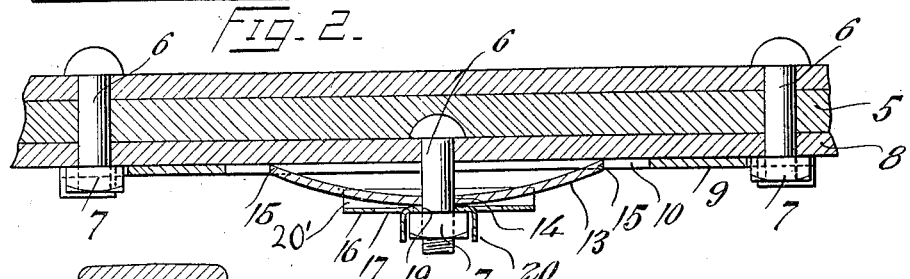
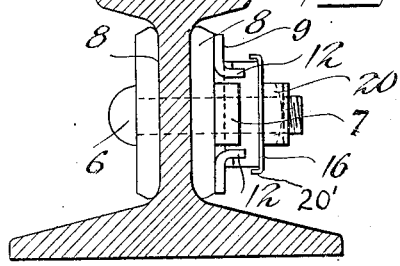
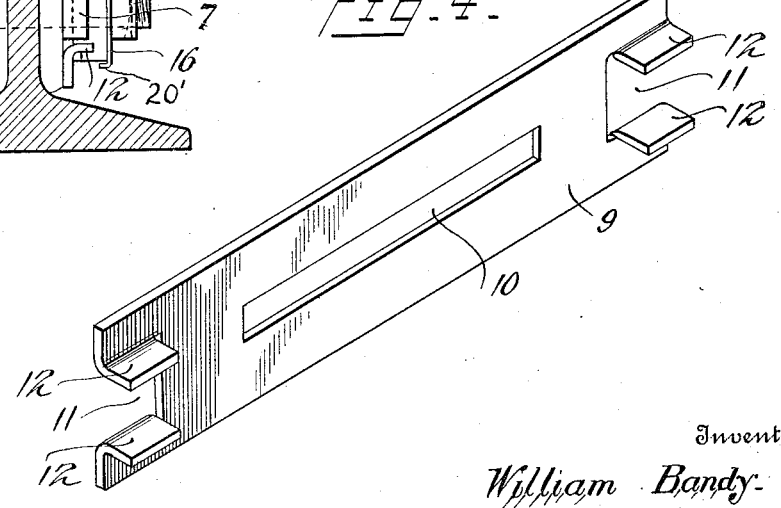
Inventor
William Bandy,
By Victor J. Evans
Attorney
Witnesses
R. F. Maryman
E. L. Mueller

UNITED STATES PATENT OFFICE.

WILLIAM BANDY, OF FOUNTAIN, COLORADO.

NUT-LOCK.

1,051,188. Specification of Letters Patent. Patented Jan. 21, 1913.

Application filed April 13, 1912. Serial No. 690,556.

*To all whom it may concern:*

Be it known that I, WILLIAM BANDY, a citizen of the United States, residing at Fountain, in the county of El Paso and State of Colorado, have invented new and useful Improvements in Nut-Locks, of which the following is a specification.

The general object of this invention is the provision of a locking device particularly adapted to use in connection with the railroad rails and which is so constructed as to engage a nut to eventually prevent the same from working loose, thus obviating the necessity of constantly tightening said nut.

In carrying out the objects of the invention generally stated above, it will be understood, of course, that the essential features thereof are susceptible to changes in details and structural arrangements, one preferred and practical embodiment being shown in the accompanying drawing, wherein:—

Figure 1 is a side elevation of the locking device, showing the same applied and constructed in accordance with the invention. Fig. 2 is a longitudinal sectional view therethrough. Fig. 3 is an edge elevation. Fig. 4 is a perspective view of the nut engaging plate used in connection with the invention.

Referring more particularly to the accompanying drawing, 5 indicates a portion of the rail having a plurality of bolts 6 attached transversely therethrough, the center bolt having its head recessed in the web of the rail, said bolts adapted to be secured in position by means of the nuts 7 which engage the fish plate 8. A flat base plate 9 is adapted to abut the said fish plate and is provided with a central longitudinally extending slot 10, the extreme ends of said plate 9 being provided with recesses as indicated at 11, the opposite edges of said recesses being formed with upstanding nut engaging flanges 12. The base plate 9 is applied so that its longitudinal slot 10 will engage one of the bolts 6 and its flanges 12 will engage the nuts 7 which have already been applied to the bolts on either side of the first mentioned bolt. A bowed spring plate 13 having a central opening 14 adapted to receive a bolt 6 is then mounted upon the base plate 9, said spring plate 13 being provided at its transverse edges with the lug extensions 15 which are adapted to engage the longitudinal slot 10 of the plate 9 thus forming a guide for the plate 13 when pressure is brought to bear thereon, said extensions and slot also coöperating to prevent any rotary movement of the said plate 13. A substantially rectangular locking plate 16 is provided therein with similarly shaped openings 17 which are spaced by means of a bridge piece 18 having the opening 19 therein for the reception of a bolt. Extending laterally from the bridge 18 on each side thereof is a nut engaging flange 20 which is adapted to be bent into engagement with the side of a nut when the same is applied to the bolt to more securely retain the latter plate 16 in engagement with the spring plate 13. The former has its longitudinal edges bent to form flanges 20' which are adapted to engage the adjacent longitudinal edges of the said plate 13 and thus prevent any possible movement of the locking plate 16 thereon.

When it is desired to apply the nut lock to the rail, the bolts 6 are first placed into engagement with the rail and fish plates and the base plate 9 is then mounted over the bolts 6 so that the slot 10 in said plate will engage the center bolt and the flanges 12 thereof will engage the end bolts. The bowed plate 13 is then mounted upon the center bolt and the extensions 15 thereof are inserted into the opening 10 in the base plate. The locking plate 16 is then mounted upon the center bolt 6 so that the flanges 20' thereof will engage the longitudinal edges of the bowed plate 13. The nut 7 of the center bolt 6 is then threaded upon the free end thereof and the flanges 20 of the locking plate are then bent laterally into engagement with the nut thus preventing rotation of the same. In order to remove the lock, it is first necessary to bend the flanges 20 out of engagement with the nut 7 and the locking plate, the bowed plate, and the base plate may then be removed in the order named.

From the foregoing description it will be obvious that the invention contemplates providing a locking device which is simple in construction, durable, and effective in carrying out the purpose for which it is designed.

What is claimed is:—

1. A device of the class described comprising a base plate adapted to engage a bolt, a bowed plate in engagement with said bolt and said base plate, and a detachable locking plate carried by said bowed plate and adapted to engage a nut mounted upon said bolt.

2. A device of the class described comprising a base plate having a longitudinal slot therein for engagement with a bolt, a bowed plate having extensions at its ends for engagement with said slot, and a locking plate mounted upon said bowed plate, said locking plate being provided with centrally located nut engaging flanges at its longitudinal edges for engaging said bowed plate.

3. A device of the class described comprising a base plate adapted to engage a bolt, means engaging said base plate for exerting an outward pressure upon a nut mounted on said bolt, and a detachable locking plate carried by said pressure exerting means for engaging said nut.

In testimony whereof I affix my signature in presence of two witnesses.

WILLIAM BANDY.

Witnesses:
W. E. SEHOLES,
JOHN REDMOND.

Copies of this patent may be obtained for five cents each, by addressing the "Commissioner of Patents, Washington, D. C."